US 6,980,884 B2

(12) United States Patent
Ballard et al.

(10) Patent No.: US 6,980,884 B2
(45) Date of Patent: Dec. 27, 2005

(54) INTRUSION MONITORS FOR MEDIA STORAGE SYSTEMS

(75) Inventors: Curtis C. Ballard, Eaton, CO (US); Leslie G. Christie, Jr., Greeley, CO (US); Mark Ayars Smith, Holdrege, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 520 days.

(21) Appl. No.: 10/197,916

(22) Filed: Jul. 16, 2002

(65) Prior Publication Data

US 2004/0013051 A1    Jan. 22, 2004

(51) Int. Cl.[7] .............................................. G06F 7/00
(52) U.S. Cl. ..................................... 700/214; 700/218
(58) Field of Search ............................ 700/214, 215, 700/218; 369/34, 34.01

(56) References Cited

U.S. PATENT DOCUMENTS

| 2,700,360 | A |   | 1/1955 | Stegman |
| 4,242,670 | A |   | 12/1980 | Smith |
| 4,945,429 | A |   | 7/1990 | Munro et al. |
| 5,059,772 | A |   | 10/1991 | Younglove |
| 5,876,076 | A |   | 3/1999 | Kosky |
| 5,993,045 | A | * | 11/1999 | Schmidtke et al. .......... 700/214 |
| 6,216,057 | B1 | * | 4/2001 | Jesionowski ................ 700/214 |
| 6,286,079 | B1 | * | 9/2001 | Basham et al. .............. 711/112 |

* cited by examiner

Primary Examiner—Gene O. Crawford

(57) ABSTRACT

An intrusion monitor for a media storage system. One embodiment of the intrusion monitor comprises a flag operatively associated with at least one storage compartment in the media storage system, the flag moving between a first position and a second position to indicate the state of at least one storage compartment. A sensor provided in the media storage system, the sensor detecting the position of the flag to determine the state of the at least one storage compartment.

25 Claims, 7 Drawing Sheets

US 6,980,884 B2

INTRUSION MONITORS FOR MEDIA STORAGE SYSTEMS

FIELD OF THE INVENTION

The invention generally pertains to media storage systems, and more specifically, to intrusion monitors for media storage systems.

BACKGROUND OF THE INVENTION

Media storage systems, or autochangers, are commonly used to store data cartridges at known locations and to retrieve the desired data cartridges so that data may be written to and/or read from the data cartridges. Accordingly, large volumes of computer-readable data can be stored on numerous data cartridges and accessed by a single computer or by multiple computers connected to the media storage system over a network.

Such media storage systems may include one or more storage magazines and cartridge read/write devices arranged in a generally U-shaped configuration, although other arrangements are also possible. The storage magazines serve as storage locations for the data cartridges, and the read/write devices may be used to read and/or write data on the data cartridges. The media storage system may also include a cartridge-engaging assembly, or "picker", as well as a drive system for moving the cartridge-engaging assembly among the data cartridges stored in the media storage system. For example, if a certain data cartridge is to be read, a control system causes the cartridge-engaging assembly to move to the location of the desired data cartridge. Then, the cartridge-engaging assembly retrieves the data cartridge and delivers it to the cartridge read/write device where the user can access the data thereon. The control system may also cause the cartridge-engaging assembly to return the data cartridge to the storage magazine following the read/write operation.

The media storage system may also have one or more storage compartments that may be opened to add, remove, or rearrange individual data cartridges and/or storage magazines in the media storage system. For example, the storage compartments may be opened so that new or different data cartridges can be added to the media storage system. Alternatively, the storage compartments may be opened so that data cartridges that have reached their capacity may be removed from the media storage system and archived.

When the media storage system is powered on, the data cartridges are inventoried so that they can be located and accessed during operations. In addition, the access panels for the storage compartments are typically locked so that they cannot be opened until the media storage system is powered off and so that the inventory remains valid during operations. When the media storage system is powered off, the access panels for the storage compartments are unlocked so that they may be opened and the storage magazines and/or data cartridges can be added, removed, or rearranged.

Any of the storage compartments may have been opened and the storage magazines and/or data cartridges removed, repositioned, or added to the media storage system while it was powered off. Accordingly, each time the media storage system is powered on, the entire media storage system must be inventoried so that the data cartridges can be located and accessed during operations. Taking inventory of the entire media storage system is a time-consuming process, particularly when only some of the data cartridges were removed, repositioned, or added. Indeed, it is an unnecessary delay where none of the data cartridges were changed while the media storage system was powered off (e.g., during a temporary power failure).

SUMMARY OF THE INVENTION

An embodiment of an intrusion monitor for a media storage system may comprise a flag operatively associated with at least one storage compartment in the media storage system, the flag moving between a first position and a second position to indicate the state of at least one storage compartment. A sensor provided in the media storage system, the sensor detecting the position of the flag to determine the state of the at least one storage compartment.

An embodiment of a method to selectively inventory a media storage system may comprise indicating the state of a plurality of storage compartments in the media storage system, automatically determining whether any of the plurality of storage compartments were opened based on the indicated state thereof, and taking inventory of only the opened storage compartments in the media storage system.

BRIEF DESCRIPTION OF THE DRAWINGS

Illustrative and presently preferred embodiments of the invention are shown in the drawings, in which.

DETAILED DESCRIPTION

Figure 1:
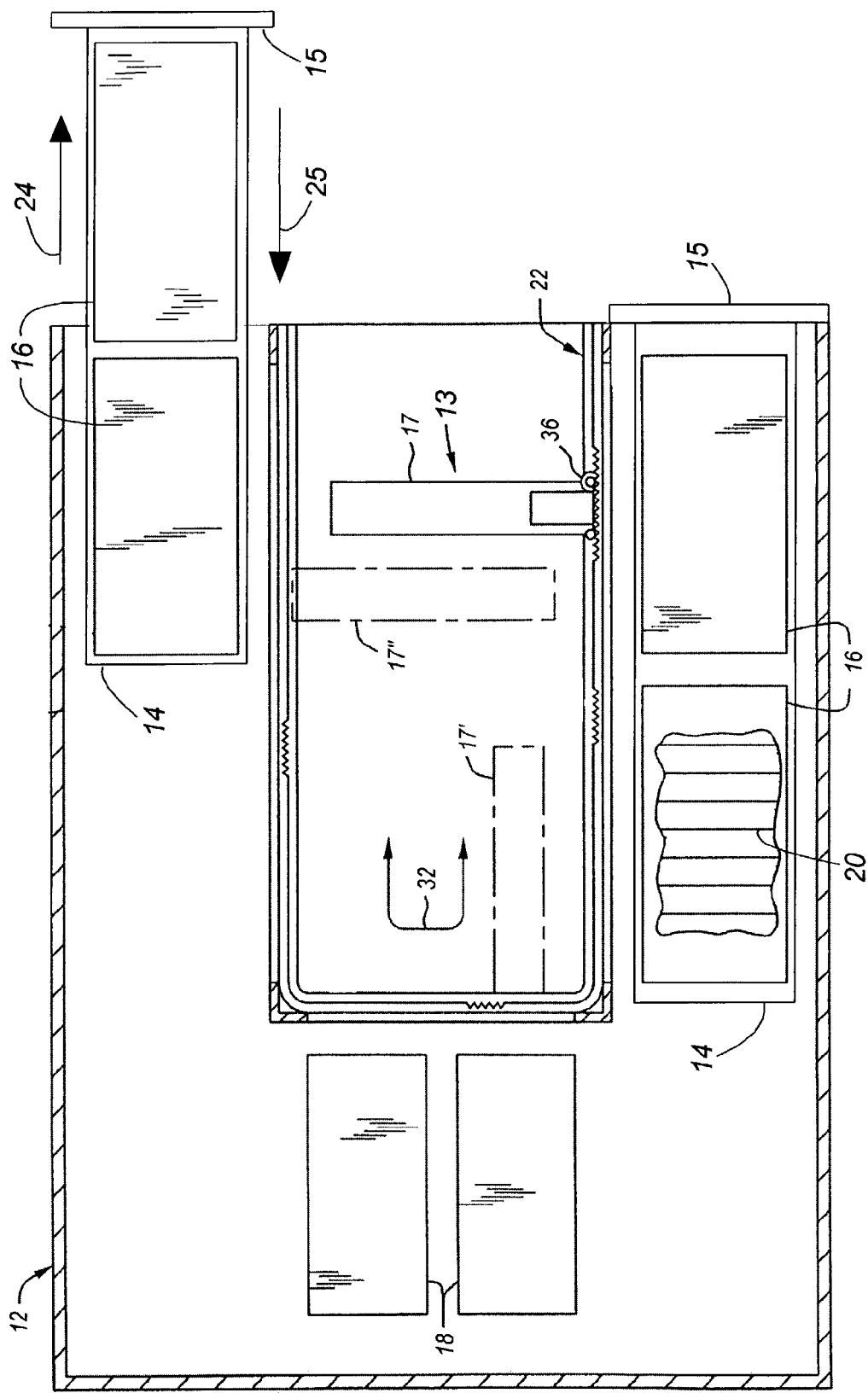
FIG. 1 is plan view of one embodiment of a media storage system as it may be used to store and access data cartridges.
Figure 2:
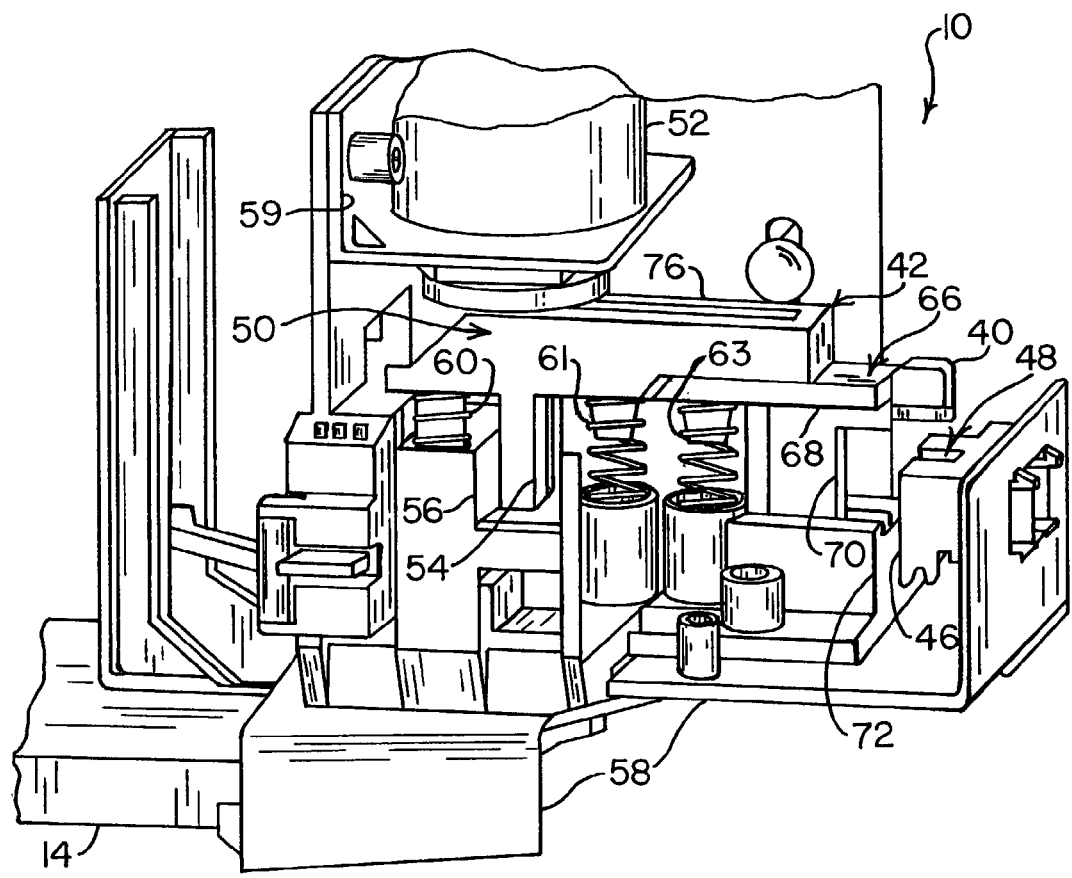
FIG. 2 is perspective view of one embodiment of an intrusion monitor for use with a media storage system such as that shown in FIG. 1.
Figure 4:
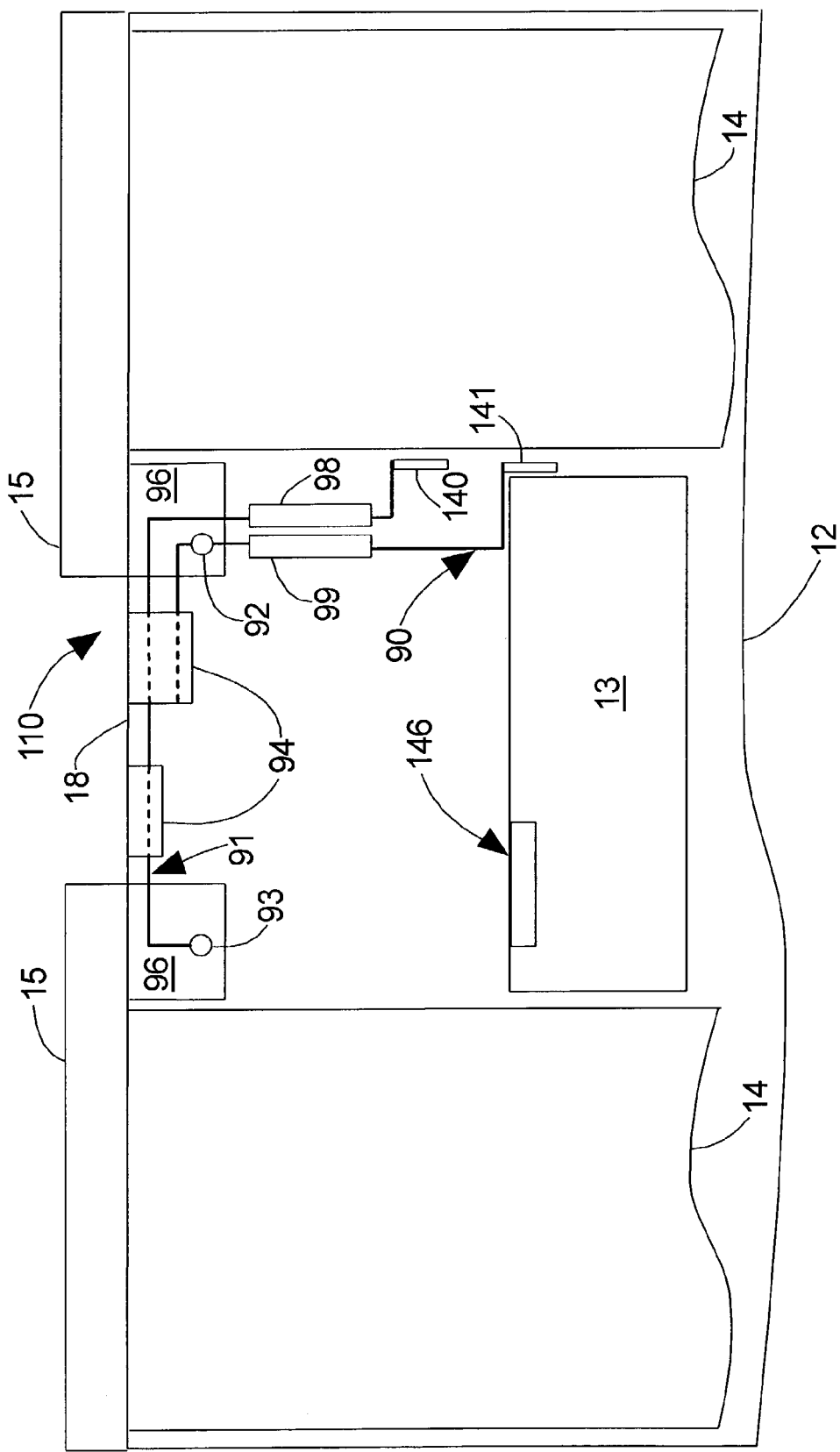
FIG. 4 a plan view of another embodiment of an intrusion monitor for use with a media storage system such as that shown in FIG. 1.

Intrusion monitors 10, 110, are shown according to embodiments of the invention in FIG. 2 and FIG. 4, respectively, and described herein as each could be used with a media storage system 12 (FIG. 1). Briefly, the storage magazine(s) 16 are typically arranged in storage compartments, such as drawers or areas that are otherwise accessible (e.g., through a door). The data cartridges can be accessed by opening the access panel 15 (e.g., a door or drawer face) in the direction of arrow 24 so that data cartridges 20 and/or storage magazines 16 may be added, removed, or rearranged in the media storage system 12. The access panel 15 can then be closed in the direction of arrow 25 for operation of the media storage system 12.

As will be explained in more detail below, the intrusion monitors 10, 110 of the present invention indicate which, if any, of the storage compartments 14 are opened so that the inventory only has to be updated with respect to those storage compartments 14 that were opened. If none of the storage compartments 14 were opened, operations can begin immediately without having to take inventory.

The intrusion monitors 10, 110 may be used according to the teachings of the invention with any suitable media storage system 12, such as the one shown in FIG. 1, to provide access to the data stored on the various data cartridges 20 at one or more read/write devices 18. The media storage system 12 may be used to store a number of data cartridges 20 in one or more of the storage magazines 16 or other suitable storage slots provided in the storage compartments 14. The storage compartments 14 may be drawers such as shown in FIG. 1, or areas that are accessible by opening a door or other suitable access panel 15. The storage compartments 14 may be opened (e.g., by moving the access panel 15 in the direction of arrow 24) so that data cartridges 20 and/or storage magazines 16 may be added, removed, or rearranged in the media storage system 12. The storage compartments 14 may then be closed for operation (e.g., by moving the access panel 15 in the direction of arrow 25).

Although the media storage system 12 is shown having four storage magazines 16 and two read/write devices 18 arranged in a generally U-shaped configuration in FIG. 1, other suitable configurations are also contemplated as being within the scope of the invention. For example, media storage systems 12 may comprise vertical stacks with additional storage magazines 16 and/or read/write devices 18. In addition, the number and arrangement of storage compartments 14 may also vary based on the design of the media storage system 12. Design considerations may include, but are not limited to, the frequency with which data is accessed by one or more users of the media storage system 12 and the desired dimensions of the media storage system 12.

It is also noted that the media storage system 12 is not limited to use with any particular type or style of read/write device(s) 18 or storage magazine(s) 16. For example, while the read/write device 18 may be a multi-capacity drive (i.e., configured to receive two or more data cartridges 20 therein), in other embodiments, the read/write device 18 may be a single-capacity drive. Similarly, the storage magazines 16 may have any suitable number of storage chambers or "slots" formed therein for receiving data cartridges 20.

Nor is the media storage system 12 limited to use with any particular type or style of storage media. The media storage system 12 is illustrated herein as it may be used with magnetic storage media (i.e., data cartridges 20), and more particularly, for use with digital linear tape (DLT) or linear tape open (LTO) data cartridges. However, any suitable storage media may be used according to the teachings of the invention, such as, but not limited to magnetic disk or tape, optical media, hard disk drive, etc.

The media storage system 12 shown in FIG. 1 also comprises a cartridge-engaging assembly 13. The cartridge-engaging assembly 13 is adapted to engage a data cartridge 20, withdraw the data cartridge 20 (e.g., from storage magazine 10), and to eject the data cartridge 20 toward the intended destination (e.g., into the read/write device 18). That is, when a user makes a request to access a particular data cartridge 20, a control system (not shown) moves the cartridge-engaging assembly 13 in the media storage system 12 (e.g., in the directions of arrow 32). Movement of the cartridge-engaging assembly 13 may be achieved, in part, via an actuator system 36 which moves the cartridge-engaging assembly 13 along the guide system 22 of the media storage system 12. For purposes of illustration, the cartridge-engaging assembly 13 is shown in positions 17, 17', and 17" in FIG. 1. The cartridge-engaging assembly 13 is shown positioned adjacent the storage magazines 16 at positions 17 and 17", and is shown adjacent the read/write device 18 at position 17'.

The media storage system 12 may also house various ancillary devices (not shown), such as power supplies, electronic controls, and data processing systems commonly associated with media storage systems.

It is noted that a wide range of cartridge-engaging assemblies, now known or that may be developed in the future, are contemplated as being within the scope of the invention. Consequently, the present invention should not be regarded as being limited to use with the particular cartridge-engaging assembly 13 shown and described herein. In addition, the media storage system 12 may be provided with two or more cartridge-engaging assemblies, thereby providing faster access to the data cartridges 20.

The data cartridges 20 and/or the various components of the media storage system 12 may be damaged if one or more of the storage compartments 14 are opened during operations. For example, if a storage compartment 14 were opened as a data cartridge 20 was being withdrawn, it could cause the data cartridge 20 to jam, or even damage one or more of the components in the media storage system 12, such as the cartridge-engaging assembly 13. In addition, it may be desirable that the inventory taken at start-up remain valid during operation of the media storage system 12 to avoid delays associated with updating the inventory during use. As such, the storage compartments 14 preferably remain closed during operation of the media storage system 12 so that data cartridges 20 and/or storage magazines 16 are not manually added, removed or rearranged. Accordingly, the media storage system 12 is provided with a lock 50 (FIG. 2) that is actuated to lock and unlock the storage compartments 14. Preferably, the storage compartments 14 are locked when the media storage system 12 is powered on, and unlocked when the media storage system 12 is powered off. However, the lock 50 may be actuated and released whenever so desired.

Figure 3A:
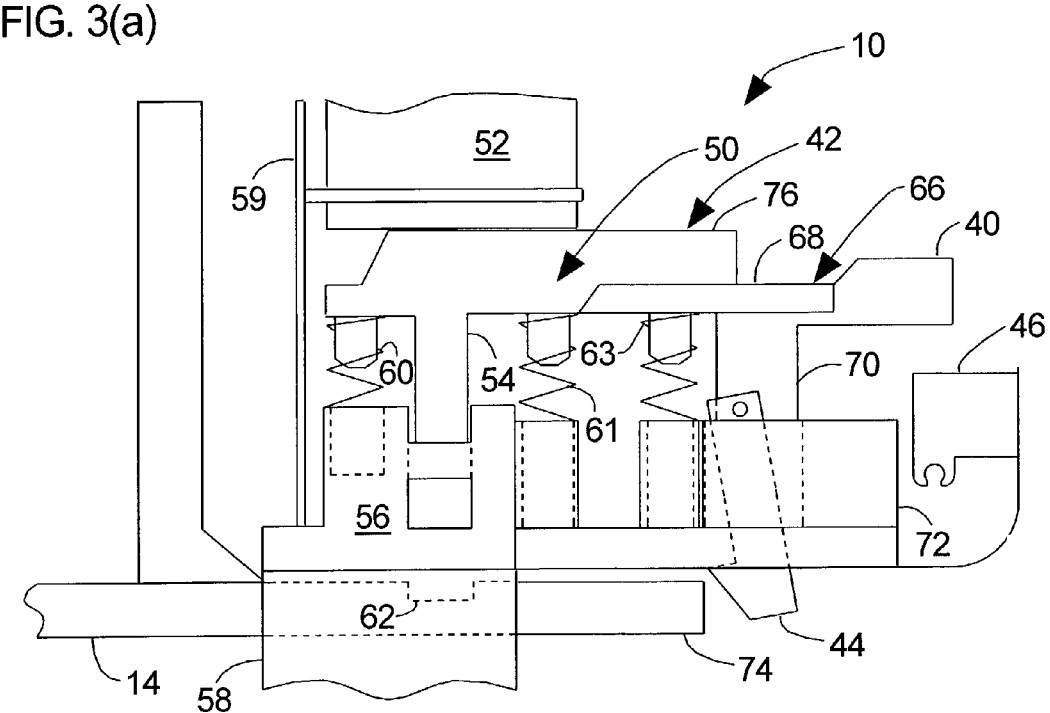
FIG. 3(a) is partial side view of the intrusion monitor shown in FIG. 2, wherein a storage compartment is unlocked.

According to one embodiment, the lock 50 may comprise a guide member 56 that is mounted adjacent at least one of the storage compartments 14 in the media storage system 12 by a bracket assembly 58. The lock 50 may also comprise a shaft 54 that is slidably fitted through the guide member 56 and resiliently biased in an open or unlocked position by springs 60, 61. In addition, the lock 50 may comprise a solenoid 52 mounted in the media storage system 12 by another bracket assembly 59 and operatively associated with the shaft 54. The solenoid 52 may be actuated to move the shaft 54 through the guide member so that it engages a notch 62 formed in the storage compartment 14 (FIG. 3(a)) and retains it in a closed or locked position so that the storage compartment 14 cannot be opened. When the solenoid 52 is released, the shaft 54 is retracted under the force of the springs 60, 61 and unlocks the storage compartment 14 so that the storage compartment 14 can be opened.

Although a particular lock 50 has been shown and described herein, it is understood that media storage system 12 may be provided with any suitable lock now known or that may be later developed. Also, one skilled in the art could readily provide the media storage system 12 with one or more locks that engage the doors that provide access to the storage areas 14.

The foregoing description of the media storage system 12 and the cartridge-engaging assembly 13 is provided in order to better understand one environment in which the various embodiments of the intrusion monitor 10, 110 of the present invention may be used. However, it should be understood that the intrusion monitor 10, 110 may be used in any of a wide range of other types of media storage systems now known or that may be developed in the future. Consequently, the intrusion monitor 10, 110 of the present invention should not be regarded as being limited to use with the particular media storage system 12 shown and described herein.

Before continuing with a description of embodiments of the intrusion monitor 10, 110, it should be noted that the conventions "first" and "second", as used herein to describe positions, are used merely for the convenience of the reader to distinguish one position from another and should not be interpreted as fixed-in-space.

As briefly described above, the media storage system 12 may be provided with an intrusion monitor 10, 110 that indicates which, if any, of the storage compartments 14 have been opened. One embodiment of such an intrusion monitor 10 is best shown in FIG. 2 as it may be used with the media storage system 12 (FIG. 1) according to the teachings of the invention.

The intrusion monitor 10 may comprise a flag 40 and a sensor 46. The flag 40 is mounted in the media storage system 12 adjacent at least one of the storage compartments 14 and is operatively associated therewith to indicate the state of the storage compartment 14. That is, the position of the flag 40, as detected by the sensor 46, indicates whether the storage compartment 14 has been opened or remains closed.

The sensor 46 may be any suitable detection device, such as, but not limited to an electronic, optical, or optoelectronic device that is capable of detecting the position of the flag 40 when it is within range of the sensor 46. Accordingly, the flag 40 may be made of, or the surface of the flag 40 coated with any suitable material that can be detected by the sensor 46. In one exemplary embodiment, the sensor 46 may comprise one or more light-emitting diodes (LEDs) and a photo-detector and the flag 40 may be coated with a non-transparent material. The LEDs transmit light that is detected by the photo-detector when the flag 40 is out of range of the sensor 46, and when the flag 40 is moved into range of the sensor 46, it blocks the light from reaching the photo-detector. In other embodiments, however, the sensor 46 may comprise a bar code reader and the flag 40 may be a bar code label (or "white" surface) that can be detected by the bar code reader. Yet other embodiments of the flag 40 and the sensor 46 are well-known and can be readily adapted by one skilled in the art for use with the intrusion monitor 10 after having become familiar with the teachings of the present invention. Consequently, the present invention should not be limited to use with any particular flag 40 and sensor 46.

The flag 40 may be mounted in the media storage system 12 on a displacement assembly 66 according to one embodiment of the invention. The displacement assembly 66 comprises an arm 68 and a shaft 70 that is mounted to slide through a guide member 72 on the bracket assembly 58. The displacement assembly 66 is resiliently biased (e.g., by spring 63) so that the flag 40 is held in a first position shown in FIG. 3(*a*). According to this embodiment, the displacement assembly 66 is resiliently biased in the first position so that the flag 40 is out of range of the sensor 46. The displacement assembly 66 is also operable to move the flag 40 into a second position shown in FIG. 3(*b*). Displacement assembly 66 is moved so that the flag 40 is within range of the sensor 46 (e.g., positioned in slot 48 of sensor 46).

Of course it is understood that the sensor 46 may be arranged in any suitable manner. For example, the flag 40 may be within range of the sensor 46 and moved out of range of the sensor 46 by operation of the displacement assembly 66.

The displacement assembly 66 may be moved into the second position by a plunge assembly 42. According to one embodiment of the invention, the plunge assembly 42 may be a modified portion of the lock 50. The lock 50 may be so modified so that it comprises an extension 76. When the lock 50 is actuated to move the shaft into the locked position, the extension 76 on the lock 50 presses the arm 68 of displacement assembly 66 in the direction of arrow 78, and hence moves the flag 40 into the second position shown in FIG. 3(*b*).

Although such an embodiment leverages the functionality of the lock 50 that may already be provided with the media storage system 12, other embodiments for operating the displacement assembly 66 to move the flag 40 into the second position are also contemplated as being within the scope of the invention. In another embodiment, a separate actuator (e.g., a solenoid) may be provided for moving the displacement assembly 66. Such alternatives may even be preferred, for example, where the media storage system 12 is not otherwise provided with a lock 50, or where the lock 50 cannot be leveraged for use with the intrusion monitor 10 of the present invention.

The displacement assembly 66 may also comprise a latch 44 to retain the flag 40 in the second position, as shown in FIG. 3(*b*). In one embodiment, the latch 44 is pivotally mounted to the shaft 70 and extends through the guide member 72. As the displacement assembly 66 is moved in the direction of arrow 78, the latch 44 moves around the lip 74 of the storage compartment 14 and engages it as illustrated by arrow 79. In other embodiments, however, the latch 44 may be rigidly mounted to, or formed as part of the shaft 70. In such an embodiment, the shaft 70 may have sufficient play within the guide member 72 so as to allow the latch 44 to move around the lip 74 of the storage compartment 14.

Before proceeding to discuss operation of the intrusion monitor 10 according to embodiments of the invention, it should be noted that the invention is not to be limited to the various embodiments described above. For example, yet additional storage compartments 14 in the media storage system 12 may be monitored by other intrusion monitors 10 to determine the state thereof. In addition, it should be noted that the components of the intrusion monitor 10 may be fabricated from any of a wide range of materials suitable for the intended application. By way of example, the intrusion monitor 10 may be fabricated from metal and/or plastic. However, the present invention should not be regarded as limited to being fabricated from any particular material(s).

Figure 3B:
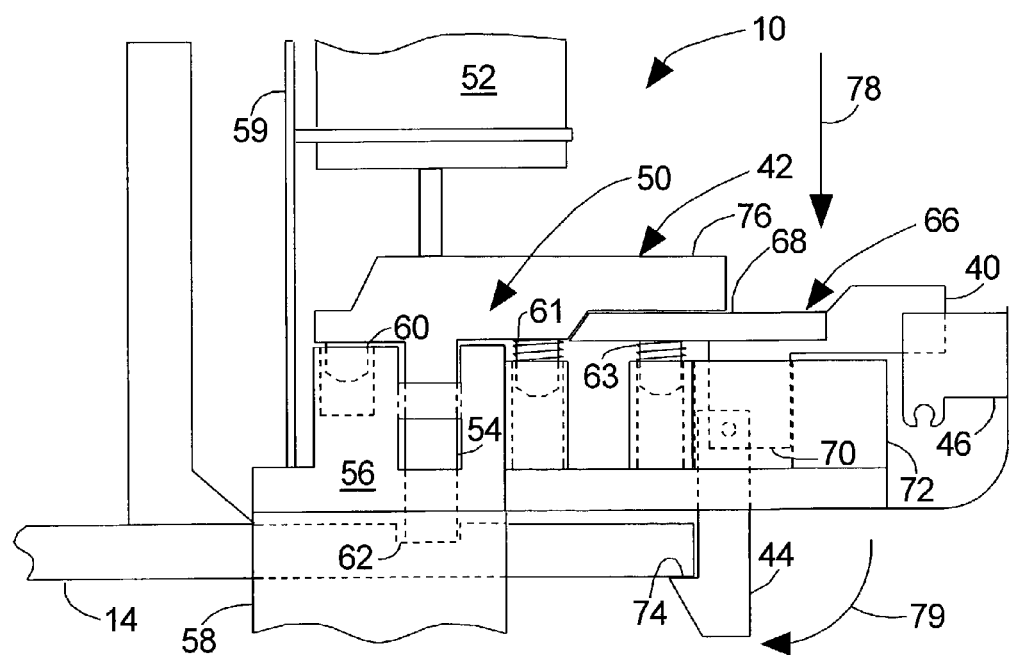
FIG. 3(b) is partial side view of the intrusion monitor shown in FIG. 2, wherein the storage compartment is locked.

In use, the intrusion monitor 10 may be operated according to one embodiment of the invention with reference to FIG. 3(*a*) through FIG. 3(*d*) as follows. Before the media storage system 12 is powered on, the flag 40 is in a first position (i.e., out of range of the sensor 46), as shown in FIG. 3(*a*). The storage compartments 14 may be opened and the data cartridges 20 and/or storage magazines 16 may be added, removed, or rearranged. The storage compartments 14 may then be closed and the media storage system 12 powered on. When the media storage system 12 is powered on, as shown in FIG. 3(b), the lock 50 is activated to lock the storage compartments 14. That is, the solenoid 52 is actuated to extend in the direction of arrow 78, thereby depressing the shaft 54 through the guide member 56 and into the notch 62 formed on the storage compartment 14 to lock the storage compartment 14 in the media storage system 12. When locked, the storage compartments 14 may not be opened during operation of the media storage system 12. The inventory of data cartridges in the media storage system 12 remains valid during operation, with updates for changes made by moving data cartridges 20 with the cartridge-engaging assembly 13.

When the lock 50 is activated to lock the storage compartments 14, the plunge assembly 42 also moves the displacement assembly 66 in the direction of arrow 78. That is, the extension 76 of the lock 50 contacts the arm 68 of the displacement assembly 66 and pushes it in the direction of arrow 78. As the displacement assembly 66 moves in the direction of arrow 78, it causes the flag 40 to move into the second position (i.e., into slot 48 and within range of the sensor 46). In addition, as the displacement assembly 66 moves in the direction of arrow 78, the guide member and the latch 44 move through the guide member 72. The latch 44 pivots around the lip 74 of the storage compartment 14 and engages it, as illustrated by arrow 79. Accordingly, the flag 40 is retained in the second position, even when the plunge assembly 42 is released.

Figure 3C:
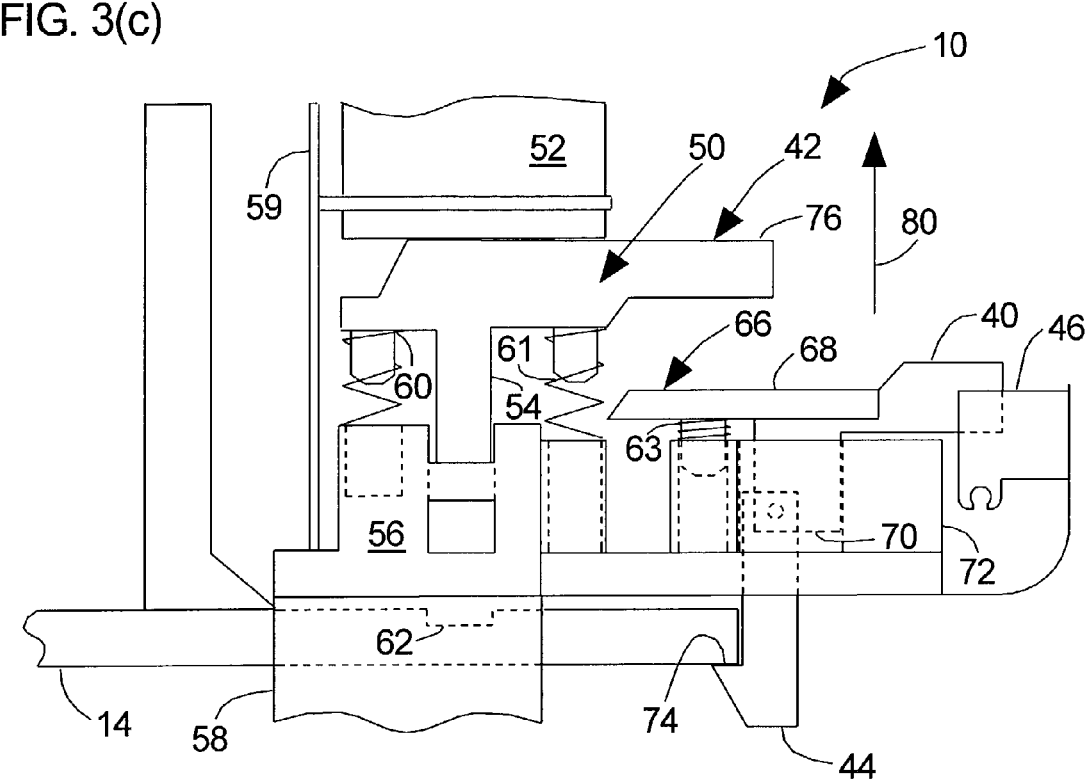
FIG. 3(c) is partial side view of the intrusion monitor shown in FIG. 2, wherein the storage compartment is unlocked and the intrusion monitor indicates that the storage compartment remains closed.

With reference to FIG. 3(c), the lock 50 may be released to allow the storage compartments 14 to be opened when the media storage system 12 is powered off. More specifically, power to the solenoid 52 is also interrupted when the media storage system 12 is powered off, which causes the solenoid 52 to release from the shaft 54. The shaft 54 then retracts (e.g., in the direction of arrow 80) from the notch 62 formed in the storage compartment 14 under the biasing force of the springs 60, 61. However, the flag 40 is retained in the second position by the latch 44, thereby indicating that the storage compartment 14 remains closed.

The storage compartments 14 may remain closed while the media storage system 12 is powered off. For example, the media storage system 12 may be powered off as a result of an intermittent power failure, or during a holiday. In any event, if the storage compartment 14 is not opened while the media storage system 12 is powered off, the flag 40 remains in the second position (i.e., within range of the sensor 46). When the media storage system 12 is powered on again, the sensor 46 detects the flag 40 in the second position and signals the control system of the same. Accordingly, the most recent inventory of any data cartridges 20 in the unopened storage compartment(s) 14 remains valid and the storage compartment(s) 14 that remained closed need not be inventoried again.

Figure 3D:
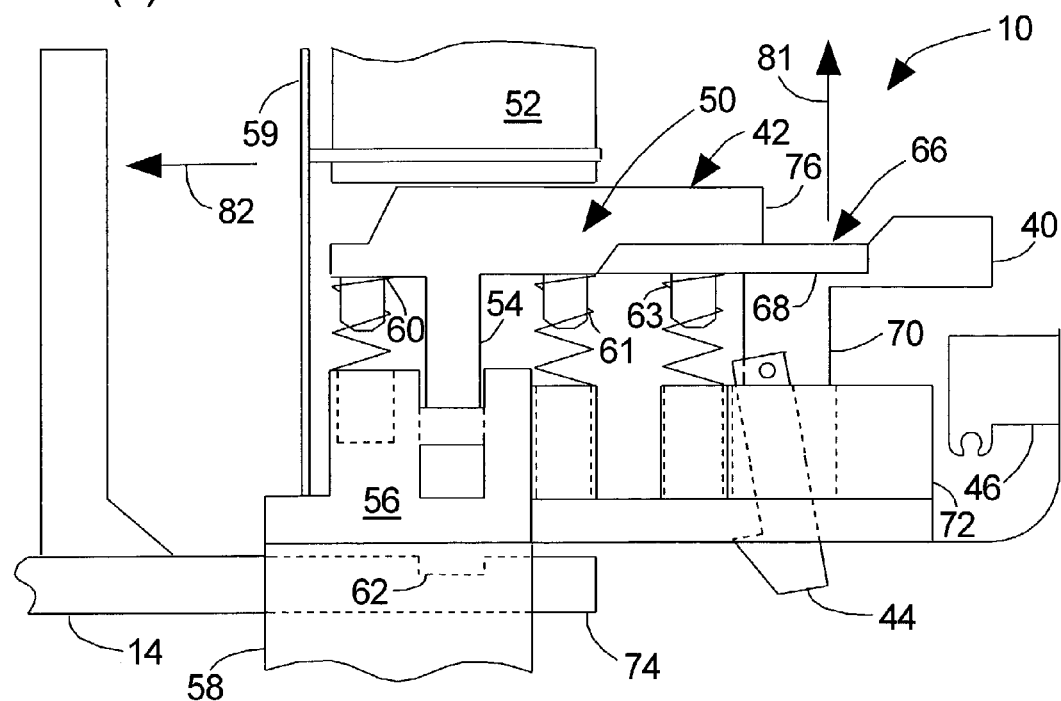
FIG. 3(d) is a partial side view of the intrusion monitor shown in FIG. 2, wherein the storage compartment has been opened.

In addition, one or more of the storage compartments 14 may be opened when the media storage system 12 is powered off. For example, data cartridges 20 and/or storage magazines 16 may be added, removed, or rearranged in the media storage system 12. With reference to FIG. 3(d), when a storage compartment 14 is opened in the direction of arrow 82, the latch 44 is released and the displacement assembly 66 moves under the biasing force of the spring 63 in the direction of arrow 81. Accordingly, the flag 40 returns to the first position (i.e., out of range of the sensor 46). Even when the storage compartment 14 is closed again, the flag 40 remains in the first position. When the media storage system 12 is powered on again, the sensor 46 no longer detects the flag 40, and signals the control system of the same. Accordingly, only the storage compartments 14 that were opened are inventoried, thereby reducing the associated delays.

Although operation of the intrusion monitor 10 has been described according to one embodiment of the invention, it is understood that other embodiments are also contemplated as being within the scope of the invention. In another embodiment, the intrusion monitor 10 may be used to detect storage compartments 14 that are opened during operation of the media storage system 12.

Another embodiment of an intrusion monitor 110 is shown in FIG. 4 as it may be used with the media storage system 12 (FIG. 1) according to the teachings of the invention. According to this embodiment, the intrusion monitor 110 may comprise a flag 140 and a sensor 146. The flag 140 is mounted in the media storage system 12 adjacent at least one of the storage compartments 14 and is operatively associated therewith to indicate the state of the storage compartment 14. That is, the position of the flag 140, as detected by the sensor 146, indicates whether the storage compartment 14 has been opened or remains closed.

Again, the sensor 146 may be any suitable sensing device, such as an electronic, optical, or optoelectronic device that is capable of detecting the position of the flag 140 when it is within range of the sensor 146. Accordingly, the flag 140 may be made of, or the surface of the flag 140 may be coated with any suitable material that can be detected by the sensor 146. In one exemplary embodiment, the sensor 146 may comprise a bar code reader, and the flag 140 may comprise a bar code label (or "white" surface) that can be detected by the bar code reader. Indeed, the same bar code reader provided with the cartridge-engaging assembly 13 to read the bar code labels on the data cartridges 20 may be used to detect the position of the flag 140. Yet other embodiments of the flag 140 and the sensor 146 are well-known and can be readily adapted by one skilled in the art for use with the intrusion monitor 110 after having become familiar with the teachings of the present invention. Consequently, the present invention should not be limited to use with any particular flag 140 and sensor 146.

According to one embodiment of the invention, the flag 140 may be mounted in the media storage system 12 on a rod assembly 90. The rod assembly 90 comprises a leg member 92 and is pivotally mounted in the media storage system 12. For example, the rod assembly 90 may be pivotally mounted to hinge 94 provided on the housing 18 of the media storage system 12.

In addition, the intrusion monitor 110 may comprise a shelf 96 on the access panel 15 of the storage compartment 14. When the storage compartment 14 remains closed, the leg member 92 rests on the shelf 96 and maintains the flag 140 in a first position shown in FIG. 5(a). When the storage compartment 14 is opened, support for the leg member 92 that was provided by the shelf 96 is removed, causing the rod assembly 90 to rotate about the hinge 94 and move the flag 140 into a second position shown in FIG. 5(b).

Figure 6A:
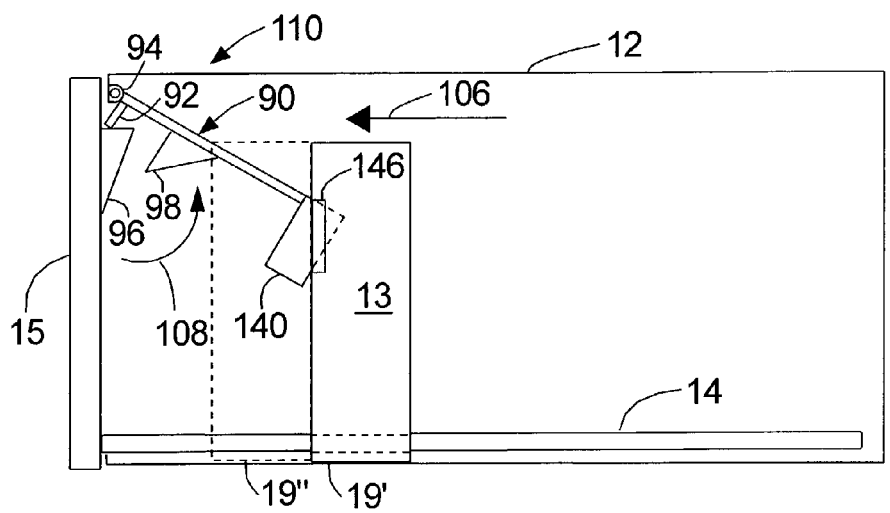
FIG. 6(a) and FIG. 6(b) are simplified side views of the intrusion monitor shown in FIG. 4 illustrating use of the cartridge-engaging assembly to reset the intrusion monitor.

Furthermore, the intrusion monitor 110 may comprise a lift assembly 98 for returning the flag 140 to the first position, thereby resetting the intrusion monitor 110. According to one embodiment, the lift assembly 98 may be mounted to the rod assembly 90 and may comprise a slanted surface, as best seen in FIG. 6(a). The cartridge-engaging assembly 13 may be operated, as described in more detail below, to move under the slanted surface of the lift assembly 98 and cause the rod assembly 90 to pivot back in the direction of arrow 108 about the hinge 94. The leg 92 is again supported on the shelf 96 and the flag 140 is returned to the first position to indicate that the storage compartment 14 remains closed.

The intrusion monitor 110 may also be used to monitor a plurality of storage compartments 14. According to one such embodiment shown in FIG. 4, the intrusion monitor 110 may comprise another rod assembly 91 having a separate flag 141 and leg member 93. The rod assembly 91 is pivotally mounted by one or more hinges 94 to the housing 18 of the media storage system 12 and extends between the first and second storage compartments 14. The other storage compartment 14 is also provided with a shelf 96 to support the leg member 93 of the rod assembly 91. In addition, the rod assembly 91 may also have a lift assembly 99 for raising the flag 141 and resetting the intrusion monitor 110.

The lift assembly 99 and the flag 141 are preferably mounted to the rod assembly 91 on the same side as the first flag 140 in the media storage system 12. Accordingly, the position of both of the flags 140, 141 may be determined and the intrusion monitor 110 may be reset without having to move the cartridge-engaging assembly 13 from one side to the other side of the media storage system 12.

Of course, other embodiments are also contemplated as being within the scope of the invention for monitoring more than one of the storage compartments 14 in the media storage system. For example, rod assemblies 90 may be provided for each of the storage compartments 14. In addition, other embodiments also contemplate vertically translating the cartridge-engaging assembly 13 within the media storage system 12 adjacent yet additional storage compartments 14 to determine the state thereof when the storage compartments 14 are so arranged in the media storage system 12. It should be noted that the components of the intrusion monitor 110 may be fabricated from any of a wide range of materials suitable for the intended application. By way of example, the intrusion monitor 110 may be fabricated from metal and/or plastic. However, the present invention should not be regarded as limited to being fabricated from any particular material(s).

In use, the intrusion monitor 110 may be operated according to one embodiment of the invention with reference to FIG. 5(a) through FIG. 5(c) and FIG. 6(a) through FIG. 6(b) as follows. Although operation is shown only with respect to one of the storage compartments 14, it is understood that the described events may occur with respect to one or more of the other storage compartments 14 in the media storage system 12.

Figure 5A:
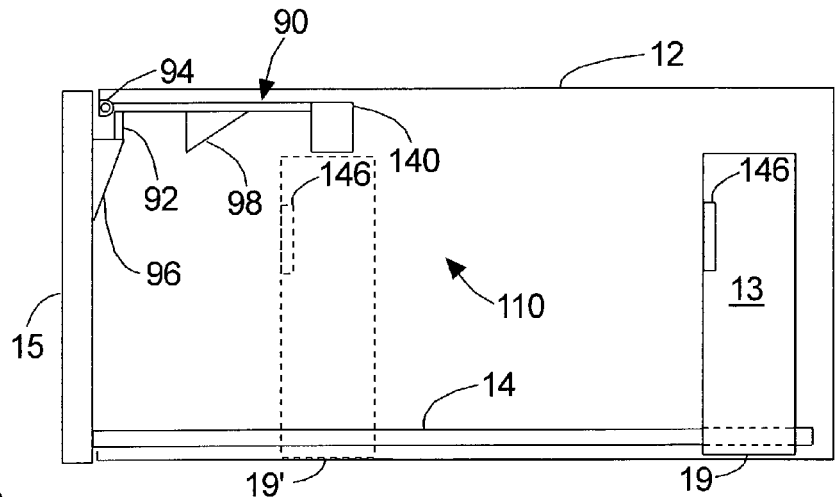
FIG. 5(a) is a simplified side view of the intrusion monitor shown in FIG. 4, wherein the intrusion monitor indicates that the storage compartment remains closed.

The media storage system 12 is shown in FIG. 5(a) during use, in which the storage compartments 14 remain closed. Preferably, the storage compartments 14 are locked during operations so that the inventory remains valid, as discussed above with respect to the intrusion monitor 10. In other embodiments, however, the storage compartments 14 may be opened during operation of the media storage system 12.

When the media storage system 12 is powered off, the storage compartments 14 may remain closed. For example, the media storage system 12 may be powered off as a result of an intermittent power failure, or during a holiday. In any event, the flag 140 remains in a first position if the storage compartment 14 is not opened. When the media storage system 12 is powered on, the cartridge-engaging assembly 13 may be moved from its current position 19 in the media storage system 12 toward a home position 19''' (FIG. 6(b)). As the cartridge-engaging assembly 13 passes under the flag 140 at position 19', the flag 140 is out of range of the sensor 146 and therefore not detected by the sensor 146. The control system is signaled to that effect to indicate that the storage compartment 14 remained closed. Accordingly, the storage compartment(s) 14 that remained closed while the media storage system 12 was powered off need not be inventoried again and the previous inventory of any data cartridges 20 accessible from the unopened storage compartment(s) 14 can still be used.

Figure 5B:
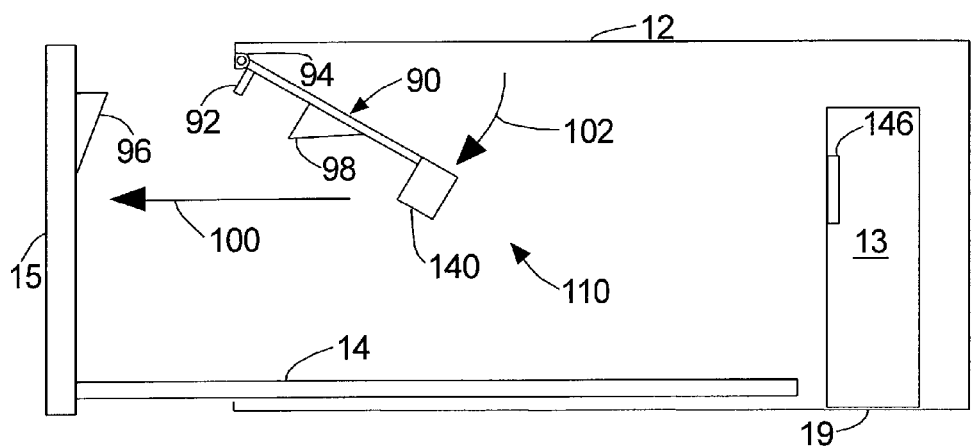
FIG. 5(b) is a simplified side view of the intrusion monitor shown in FIG. 4, wherein the storage compartment has been opened.
Figure 5C:
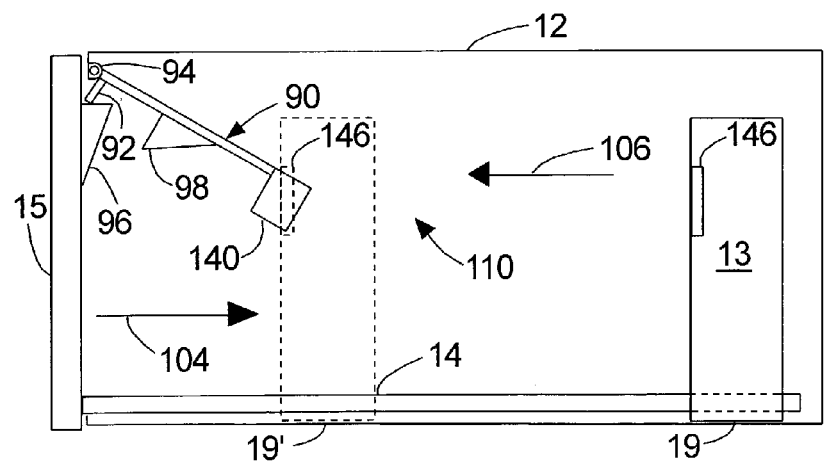
FIG. 5(c) is a simplified side view of the intrusion monitor shown in FIG. 4, wherein the intrusion monitor indicates that the storage compartment has been opened.

Alternatively, one or more of the storage compartments 14 may be opened. For example, one of the storage compartments 14 may be opened so that data cartridges 20 and/or storage magazines 16 may be added, removed, or rearranged in the media storage system 12. With reference to FIG. 5(b), when a storage compartment 14 is opened in the direction of arrow 100, support for the leg 92 is removed and the flag 140 moves into a second position. That is, the shelf 96 moves outward with the access panel 15 as the storage compartment 14 is opened, causing the rod assembly 90 to pivot about the hinge 94 in the direction of arrow 102 into the second position. The flag 140 remains in the second position even when the storage compartment 14 is closed again, as shown in FIG. 5(c). When the media storage system 12 is powered on again, the cartridge-engaging assembly 13 may be moved in the direction of arrow 106 from its current position 19 toward the home position 19''' in the media storage system 12. As the cartridge-engaging assembly 13 passes the flag 140 (e.g., at position 19') the sensor 146 detects the flag 140 in the second position and signals the control system (not shown) of the same, thereby indicating that the storage compartment 14 has been opened. Accordingly, only the storage compartments 14 that were opened are inventoried, reducing the delay associated with taking inventory of the entire media storage system 12.

Figure 6B:
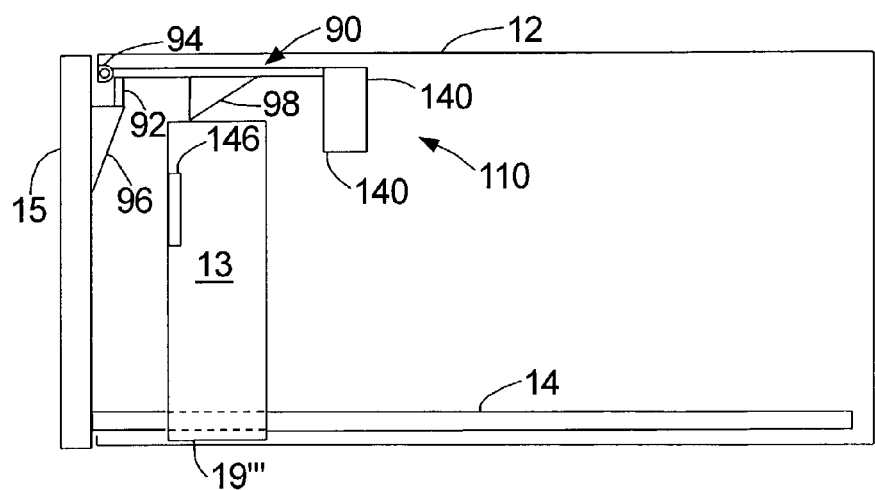

Once it has been determined that a storage compartment 14 was opened, the flag 140 may be reset, as illustrated in FIG. 6(a) and FIG. 6(b) according to one embodiment of the invention. As previously discussed, the cartridge-engaging assembly 13 may be moved toward a home position 19''' (FIG. 6(b)) in the media storage system 12. As the cartridge-engaging assembly 13 moves in the direction of arrow 106, the sensor 146 may be operated to determine the position of the flag 140. The cartridge-engaging assembly 13 continues to move in the direction of arrow 106 and engages the lift assembly 98 (e.g., in position 19''). The cartridge-engaging assembly 13 still continues to move in the direction of arrow 106, causing the lift assembly 98 to slide upward in the direction of arrow 108. When the cartridge-engaging assembly 13 is in the home position 19''', the flag has thus been returned to the first position, as illustrated in FIG. 6(b).

Although operation of the intrusion monitor 110 has been described according to one embodiment of the invention, it is understood that other embodiments are also contemplated as being within the scope of the invention.

According to the teachings of the invention, the intrusion monitor 10, 110 may be provided with media storage system 12 for selectively taking inventory of storage compartments 14. Computer-readable program code is preferably provided on suitable one or more suitable computer-readable storage media and is accessible by the media storage system 12 (e.g., a suitable control system) to selectively inventory the media storage system 12. One embodiment may comprise program code for taking inventory of the media storage system 12. Program code may also be provided for receiving a signal from the intrusion monitor 10, 110 indicating the state of the storage compartment(s) 14. Based on the indicated state of the storage compartment(s) 14, program code may also be provided for updating the inventory for only the storage compartment(s) 14 which have been opened. For example, the computer-readable program code may operate a bar code reader (e.g., on the cartridge-engaging assembly 13) to read the labels from data cartridges in the storage compartment(s) 14 that were opened.

What is claimed is:

1. A method to selectively inventory a media storage system, comprising:
    indicating the state of a plurality of storage compartments in said media storage system using respective movable elements;
    automatically determining whether any of said plurality of storage compartments were opened based on detecting a position of each of the movable elements; and
    taking inventory of only said opened storage compartments in said media storage system.

2. The method of claim 1, wherein taking inventory is automatic.

3. The method of claim 1, wherein indicating the state of said plurality of storage compartments continues after said media storage system is powered off.

4. The method of claim 1, wherein determining whether any of said plurality of storage compartments were opened is after said media storage system is powered on.

5. The method of claim 1, further comprising resetting the indicated state of at least one of said plurality of storage compartments.

6. The method of claim 1, wherein each movable element is at a first position in response to the respective storage compartment remaining closed, and wherein each movable element is moved to a second position in response to the respective storage compartment being opened, the method further comprising detecting the position of each movable element using at least one sensor.

7. A media storage system, comprising:
    plural storage compartments; and
    plural intrusion monitors operatively associated with said storage compartment, each intrusion monitor having a movable element that is movable from a first position to a second position in response to opening of the respective storage compartment, the movable element to indicate to the media storage system whether the respective storage compartment has been opened.

8. The media storage system of claim 7, wherein each intrusion monitor indicates the state of a respective storage compartment while said media storage system is turned off.

9. A media storage system, comprising:
    at least one storage compartment; and
    an intrusion monitor operatively associated with said at least one storage compartment, said intrusion monitor indicating to the media storage system the state of said at least one storage compartment,
    wherein said intrusion monitor is pivotally mounted adjacent said at least one storage compartment, said intrusion monitor rotating from a first position to a second position when said storage compartment is opened.

10. The media storage system of claim 9, further comprising a lock operatively associated with said at least one storage compartment, said lock movable between a locked position and an unlocked position.

11. The media storage system of claim 10, wherein said lock moves to said locked position when said media storage system is turned on and said lock moves to said unlocked position when said media storage system is turned off.

12. A media storage system, comprising:
    at least one storage compartment; and
    an intrusion monitor operatively associated with said at least one storage compartment, said intrusion monitor indicating to the media storage system the state of said at least one storage compartment;
    a lock operatively associated with said at least one storage compartment, said lock movable between a locked position and an unlocked position,
    wherein said lock is operable to reset said intrusion monitor when said lock is moved to said locked position.

13. An intrusion monitor for a media storage system, comprising:
    a flag operatively associated with at least one storage compartment in said media storage system, said flag moving between a first position and a second position to indicate the state of said at least one storage compartment; and
    a sensor provided in said media storage system, said sensor detecting the position of said flag to determine the state of said at least one storage compartment.

14. The intrusion monitor of claim 13, wherein said flag comprises machine-readable indicia.

15. The intrusion monitor of claim 13, wherein said sensor is a bar code reader.

16. The intrusion monitor of claim 13, further comprising a plunge assembly mounted in the media storage system, said plunge assembly operable to move said flag from said first position into said second position.

17. The intrusion monitor of claim 13, further comprising a latch operatively associated with said flag, said latch holding said flag in a second position until said at least one storage compartment is opened, said latch releasing said flag when said at least one storage compartment is opened so that said flag moves to said first position.

18. The intrusion monitor of claim 13, further comprising a lock mounted in the media storage system and operable to move said flag based on the state of said at least one storage compartment.

19. The intrusion monitor of claim 13, further comprising a lift assembly mounted in said media storage system, said lift assembly operable to reset the position of said flag.

20. The intrusion monitor of claim 19, wherein said lift assembly is operable by a cartridge-engaging assembly to reset the position of said flag.

21. The intrusion monitor of claim 13, further comprising a rod assembly having said flag mounted thereto, said rod assembly pivotally mounted in the media storage system and operatively associated with said at least one storage compartment.

22. The intrusion monitor of claim 21, further comprising an access panel provided adjacent said at least one storage compartment, wherein said rod assembly maintains said flag in said first position when said access panel is closed, and said rod assembly moves said flag to said second position when said access panel is opened.

23. The intrusion monitor of claim 22, further comprising a shelf mounted on said at least one storage compartment, said shelf supporting said rod assembly when said access panel is closed.

24. An apparatus for selectively inventorying a media storage system, comprising:
    computer-readable storage medium;
    computer-readable program code stored on said computer-readable storage medium, said computer-readable program code comprising:
    program code for taking inventory of said media storage system;

program code for receiving a signal from an intrusion monitor having a movable element that is movable between a first position and a second position, said received signal indicating whether the movable element has been moved from the first position to the second position in response to opening of at least one storage compartment in said media storage system; and program code for updating the inventory for said at least one storage compartment if the received signal indicates that said at least one storage compartment has been opened.

25. The apparatus of claim 24, the program code for receiving the signal from a sensor in the intrusion monitor, the signal having a first value in response to the movable element being at the first position, and the signal having a second value in response to the movable element being at the second position.

* * * * *

UNITED STATES PATENT AND TRADEMARK OFFICE
CERTIFICATE OF CORRECTION

PATENT NO. : 6,980,884 B2
APPLICATION NO. : 10/197916
DATED : December 27, 2005
INVENTOR(S) : Curtis C. Ballard et al.

It is certified that error appears in the above-identified patent and that said Letters Patent is hereby corrected as shown below:

In column 11, line 37, in Claim 7, delete "compartment," and insert -- compartments, --, therefor.

Signed and Sealed this

Eleventh Day of August, 2009

David J. Kappos
*Director of the United States Patent and Trademark Office*